United States Patent
Mori et al.

(10) Patent No.: US 10,168,735 B2
(45) Date of Patent: Jan. 1, 2019

(54) ELECTRONIC DEVICE

(71) Applicant: Panasonic Intellectual Property Management Co., Ltd., Osaka (JP)

(72) Inventors: Takeshi Mori, Osaka (JP); Akira Iwamoto, Osaka (JP); Kenichi Shindo, Osaka (JP); Tetsuya Urimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 15/190,384

(22) Filed: Jun. 23, 2016

(65) Prior Publication Data

US 2016/0299528 A1 Oct. 13, 2016

Related U.S. Application Data

(63) Continuation of application No. PCT/JP2014/004229, filed on Aug. 19, 2014.

(30) Foreign Application Priority Data

Dec. 25, 2013 (JP) .................... 2013-267408

(51) Int. Cl.
*G06F 1/16* (2006.01)
*H01Q 1/22* (2006.01)

(52) U.S. Cl.
CPC .......... *G06F 1/1626* (2013.01); *G06F 1/1637* (2013.01); *G06F 1/1656* (2013.01); *H01Q 1/2258* (2013.01)

(58) Field of Classification Search
CPC .... G06F 1/1626; G06F 1/1637; G06F 1/1656; H01Q 1/2258

(Continued)

(56) References Cited

U.S. PATENT DOCUMENTS

| 8,238,087 B2 * | 8/2012 | McClure | G06F 1/1613 248/178.1 |
| 8,339,537 B2 * | 12/2012 | Bo | G02F 1/133308 349/58 |

(Continued)

FOREIGN PATENT DOCUMENTS

| JP | 11-25950 | 1/1999 |
| JP | 2000-194268 | 7/2000 |

(Continued)

OTHER PUBLICATIONS

International Search Report issued in International Application No. PCT/JP2014/004229 dated Nov. 4, 2014.

(Continued)

*Primary Examiner* — Tuan T Dinh
*Assistant Examiner* — Rockshana D Chowdhury
(74) *Attorney, Agent, or Firm* — Wenderoth, Lind & Ponack, L.L.P.

(57) ABSTRACT

An electronic device includes a display member, a glass plate that has an area larger than that of a front face of the display member, the glass plate covering the overall front face of the display member, a frame that has a first holding portion holding a portion of the glass plate corresponding to a circumference of the display member, and an outer covering member surrounding a side portion of the glass plate. The outer covering member has a second holding portion that is inserted between the glass plate and the frame and holds a portion of the glass plate not held by the frame.

4 Claims, 4 Drawing Sheets

(58) Field of Classification Search
USPC .................................................... 361/679.3
See application file for complete search history.

(56) References Cited

U.S. PATENT DOCUMENTS 9,344,539 B2 * 5/2016 Wang .................... G06F 1/1626
2010/0091439 A1   4/2010 Horii

FOREIGN PATENT DOCUMENTS

| JP | 2000-223858 | 8/2000 |
| JP | 2008-187453 | 8/2008 |
| JP | 2011-205499 | 10/2011 |
| JP | 2013-239788 | 11/2013 |

OTHER PUBLICATIONS

International Preliminary Report on Patentability issued in International Application No. PCT/JP2014/004229 dated Jun. 28, 2016.

* cited by examiner

ELECTRONIC DEVICE

CROSS-REFERENCE TO RELATED APPLICATIONS

This is a continuation application of International Application. No. PCT/JP2014/004229, with an international filing date of Aug. 19, 2014, which claims priorities of Japanese Patent Application No.: 2013-267408 filed on Dec. 25, 2013, the content of which is incorporated herein by references.

BACKGROUND

1. Technical Field

The present disclosure relates to an electronic device that includes a glass plate covering a front face of a display member.

2. Related Art

An electronic device such as a displaying apparatus or a tablet computer includes a display member to display images, characters, and so on. JP-A-2000-223858 discloses a holding structure for a display member. According to JP-A-2000-223858, the display member is supported by a protruding portions disposed on a side portion of a frame-like case main body and laterally protruding therefrom.

SUMMARY

On a front face of the display member, a protective glass plate may be disposed that has an area larger than that of the front face of the display member and that covers the front face of the display member. A space may therefore be formed that has no parts, and so on, present therein, on a back face of the protective glass plate corresponding to a portion to be the circumference of the display member. In this case, the glass plate may be broken when a strong force is applied to the glass plate from its front face side.

The present disclosure provides an electronic device that can properly protect the protective glass plate disposed on the front face of the display member.

An electronic device according to the present disclosure includes a display member, a glass plate that has an area larger than that of a front face of the display member, the glass plate covering the overall front face of the display member, a frame that has a first holding portion holding a portion of the glass plate corresponding to a circumference of the display member, and an outer covering member surrounding a side portion of the glass plate. The outer covering member has a second holding portion that is inserted between the glass plate and the frame and holds a portion of the glass plate not held by the frame.

According to the electronic device of the present disclosure, the glass plate is held by first holding portions of a frame and second holding portions of an outer covering member. Even when a force is externally applied to the glass plate, the first holding portions and the second holding portions therefore receive the force. Any breakage, and so on, of the glass plate caused by the external force is therefore suppressed.

DETAILED DESCRIPTION OF PREFERRED EMBODIMENT

First Embodiment

An embodiment will be described in detail with arbitrary reference to the drawings. No description however may be made that is more detailed than necessary. For example, no detailed description of already well known items and no repeated description for substantially same configurations may be made. This is to avoid unnecessary redundancy of the following description and is to facilitate the understanding by those skilled in the art.

The inventor(s) provide(s) the accompanying drawings and the following description for those skilled in the art to sufficiently understand the present disclosure, and do(es) not intend to limit the subject matter described in claims by the drawings and the description.

In the following description, terms each meaning a specific direction (for example, "above", "under", "left", "right", and other terms including any one of these) maybe used while the use of those terms is to facilitate the understanding of the present disclosure with reference to the drawings, and the present disclosure should not be interpreted being limited by the meaning of each of those terms.

The embodiment of the present disclosure described below takes an example of application to a what-is-called tablet-type portable information terminal apparatus (hereinafter, arbitrarily, referred to as "tablet terminal apparatus" or simply as "apparatus"). The tablet terminal apparatus includes a CPU, a storing device such as a RAM, a ROM, or an SSD, an input unit, and various types of external interface, and realizes predetermined functions by arithmetic processing by the CPU based on programs stored in the storing apparatus.

Figure 1:
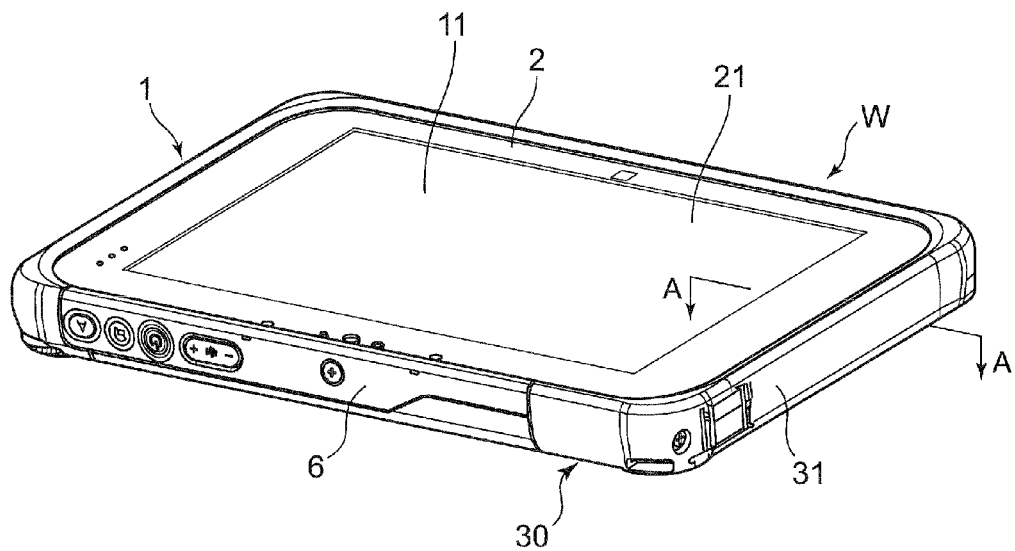
FIG. 1 is a perspective view of an upper face (a display face) of a tablet terminal apparatus according to an embodiment of the present disclosure.
Figure 2:
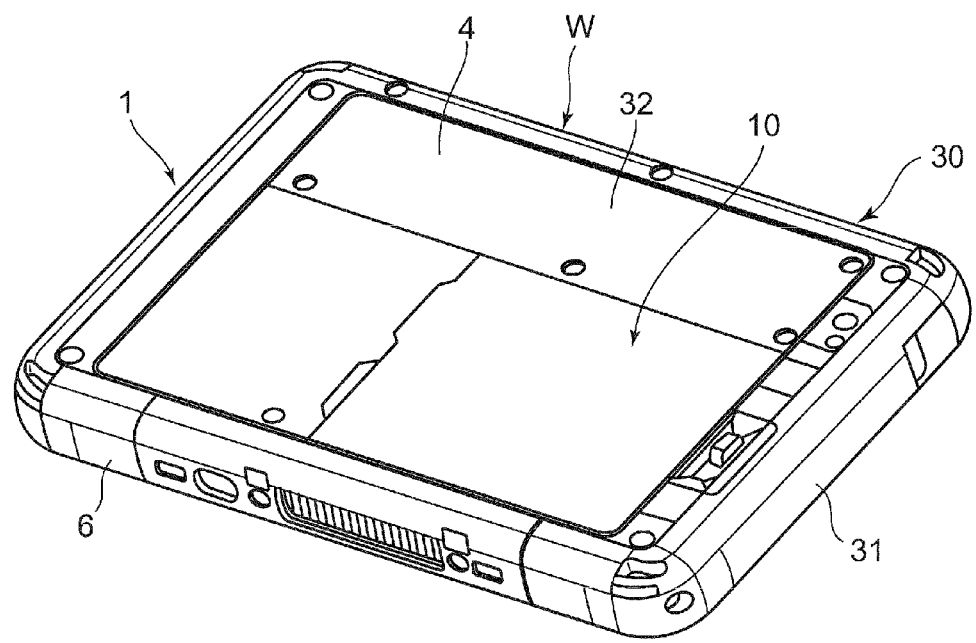
FIG. 2 is a perspective view of a lower face (a back face) of the tablet terminal apparatus according to the embodiment of the present disclosure.

FIG. 1 is a perspective view of an upper face (a display face) of the tablet terminal apparatus as the electronic device according to this embodiment. FIG. 2 is a perspective view of a lower face (a back face) of the tablet terminal apparatus.

As depicted in these figures, a tablet terminal apparatus W according to this embodiment is formed into a substantially rectangular shape in a planar view and has a predetermined thickness (height). A glass plate 21 is disposed on the upper face portion 2 of the tablet terminal apparatus W. A display member 11 is disposed on the lower face of the glass plate 21. The display member 11 includes a glass plate 21 making up the upper face thereof. The display member 11 is a liquid crystal display apparatus, for example. The display member 11 may be a touch panel display apparatus enabling a user to perform touch input. A battery pack 10 is mounted on a lower face portion 4 (the back face side) of the tablet terminal apparatus W. The battery pack 10 is provided detachably according to a user operation on the battery lock operating member. Various operation switches and various connectors are disposed on a side face portion 6 of the tablet terminal apparatus W.

The tablet terminal apparatus W includes as a housing 1 an outer case 30 constituting an outer face thereof except the upper face portion constituted by the glass plate 21. The outer case 30 includes a side face member 31 constituting the side face portion 6 and a lower face member 32 constituting the lower face portion 4. The side face member 31 has a frame-like shape in a planar view thereof. The members constituting the outer case 30 are made of, for example, a resin such as, for example, elastomer.

Figure 4:
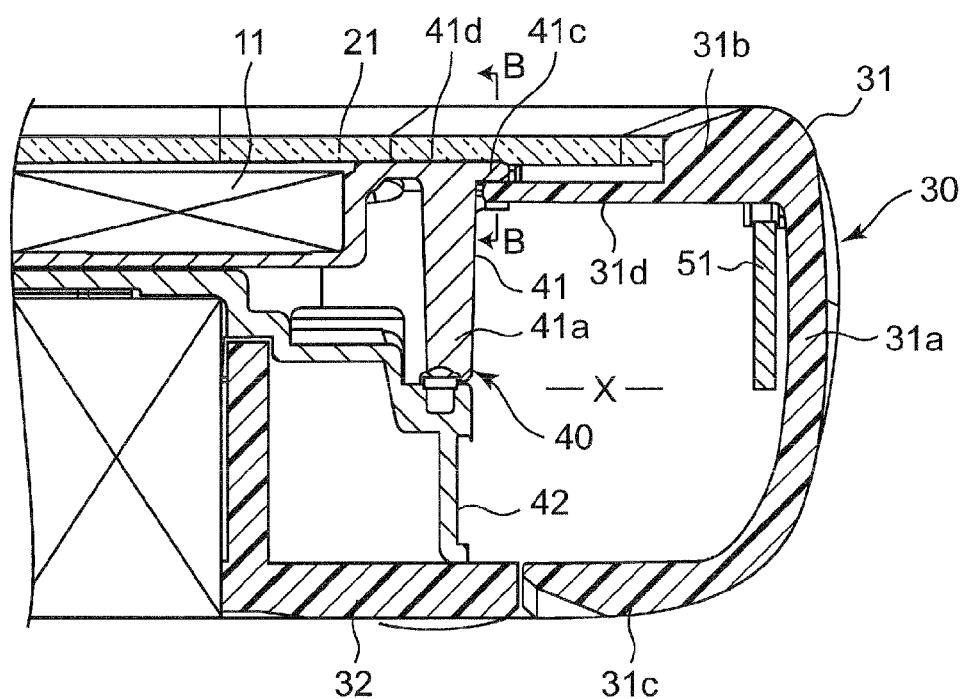
FIG. 4 is a cross-sectional view taken along an A-A line of FIG. 1 omitting a portion therefrom.

As depicted in FIG. 4, an inner case 40 is accommodated in an inner space surrounded by the outer case 30 and the glass plate 21. The inner case 40 is configured to have a box-like shape to be able to accommodate various electronic parts. The inner case 40 includes an upper member 41 disposed on the glass plate 21 side, and a lower member 42 disposed on the opposite side of the glass plate 21. The inner case 40 constitutes the frame (framework material) of the tablet terminal apparatus W, and is formed using a metal material such as, for example, magnesium (Mg) to secure the mechanical rigidity and so on. In the following description, the upper member 41 and the lower member 42 will not be distinguished from each other and will be described as the inner case 40.

Figure 3A:
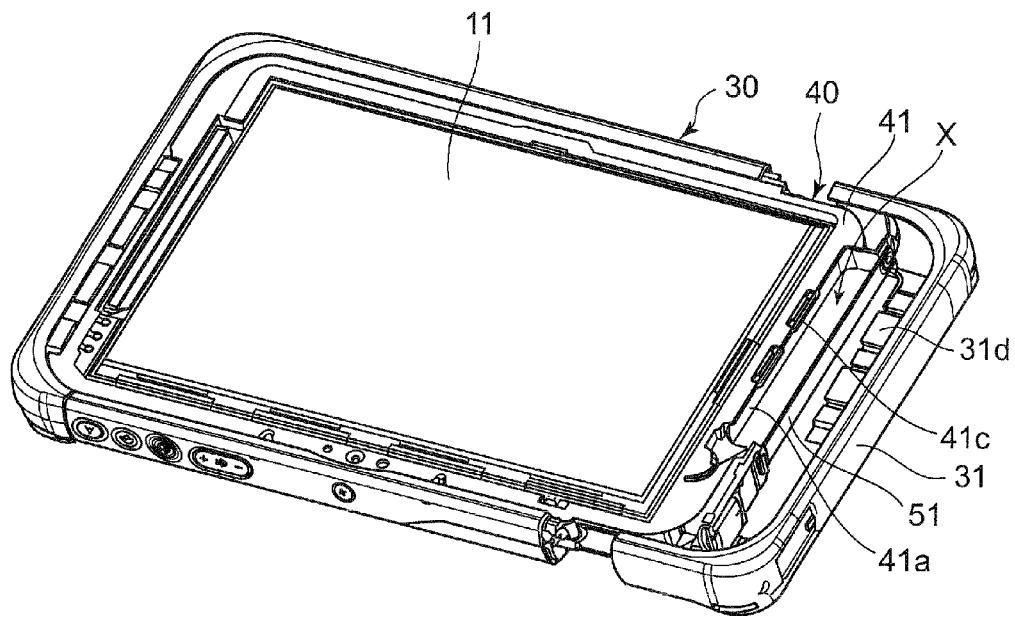
FIG. 3A is a perspective view of the upper face (the display face) of the tablet terminal apparatus according to the embodiment of the present disclosure from which a glass plate is removed and from which a portion of a side face member of an outer cover is removed.

As depicted in FIG. 3A, a recess portion 41a is formed on one side portion of the inner case 40 (a side portion in the lower right of FIG. 3A), that is formed by recessing a portion of the one side portion in a direction to get away from the corresponding side portion of the outer case 30 (a side face member 31) by a predetermined length in the longitudinal direction of the terminal apparatus W. The recess portion 41a forms a space X between the inner case 40 and the outer case 30 as depicted in FIG. 4. The space X is formed for disposing an antenna 51 therein for radio communication. The space X will hereinafter be referred to as "antenna disposition space X".

As depicted in FIG. 4, the side face member 31 of the outer case 30 includes a side wall portion 31a, an upper wall portion 31b extending substantially perpendicularly to the side wall portion 31a from the upper end of the side wall portion 31a, and a lower wall portion 31c extending substantially perpendicularly to the side wall portion 31a from the lower end of the side wall portion 31a, and has a cross section formed into a substantially U-shape.

In this embodiment, the antenna disposition space X is formed as mentioned above under the lower face of the glass plate 21 on the side of the one side portion of the tablet terminal apparatus W. A configuration is therefore necessary for avoiding any breakage of the glass plate 21 that occurs when a force is applied to the glass plate 21 in its portion positioned above the antenna disposition space X and not held by the inner case 40. The portion of the glass plate 21 not held by the inner case 40 is the portion of the glass plate 21 on which the antenna disposition space X is projected in a direction perpendicular to the main face thereof (hereinafter, arbitrarily referred to as "portion above the antenna disposition space X"). To cope with this, this embodiment employs a structure as follows.

Figure 3B:
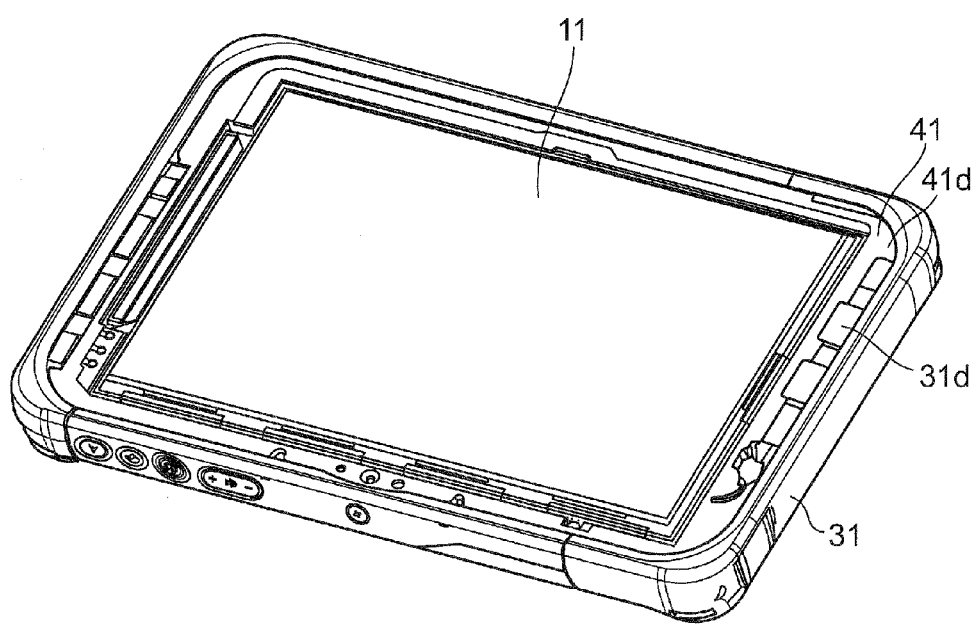
FIG. 3B is a perspective view of the upper face (the display face) of the tablet terminal apparatus according to the embodiment of the present disclosure from which the glass plate is removed.
Figure 5:
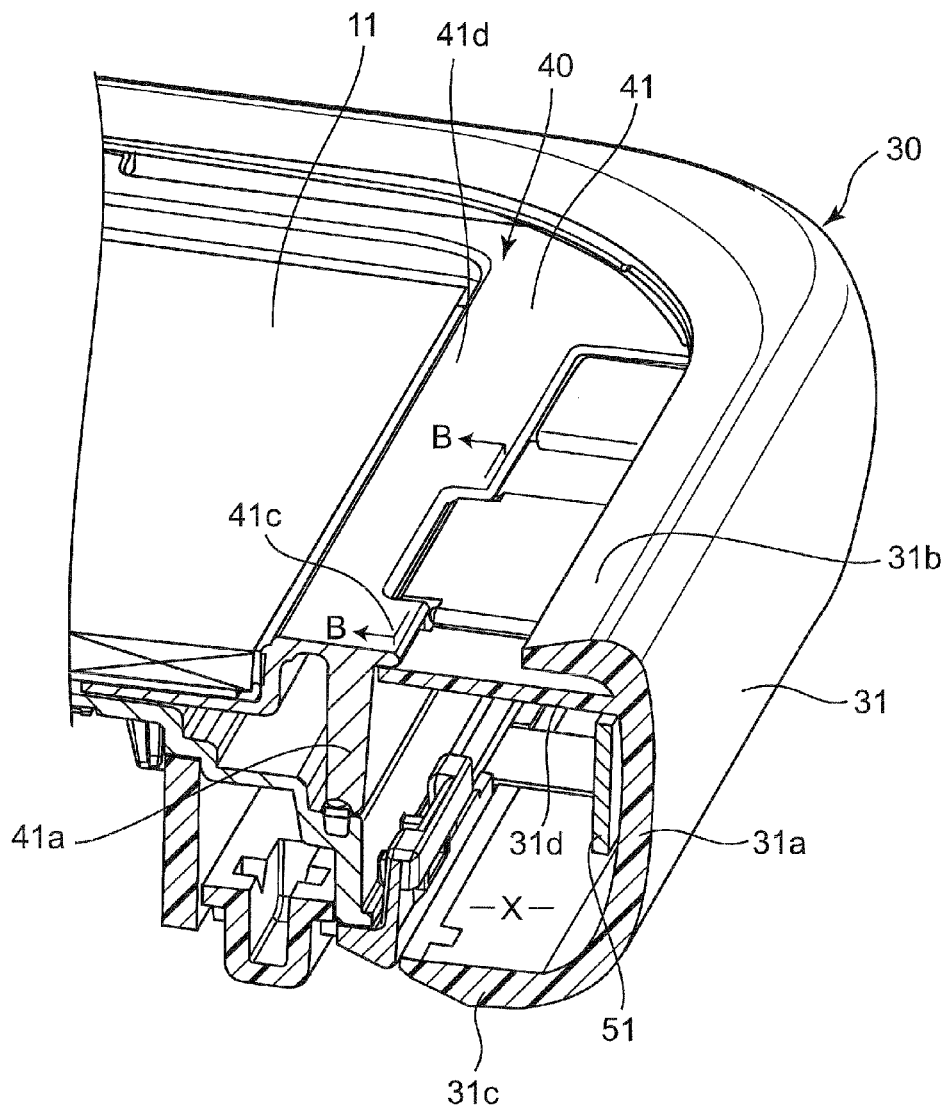
FIG. 5 is a perspective cross-sectional view taken along the A-A line of FIG. 1.

As depicted in FIGS. 4 and 5, in this embodiment, a circumference portion of the display member 11, of a portion except the portion above the antenna disposition space X of the glass plate 21, is held by the upper wall portion 41d of the inner case 40 accommodating the display member 11. In this embodiment, outer ribs 31d are disposed on the outer case 30 and extend in parallel to the main face of the glass plate 21 from the vicinity of the upper end of the side wall portion 31a toward the inner case 40, as portions to hold the portion of the glass plate 21 above the antenna disposition space X. Thereby, as depicted in FIG. 3B, the outer ribs 31d of the outer case 30 are present in a portion not having the upper wall portion 41d of the inner case 40. Thereby, the glass plate 21 is held by the outer ribs 31d of the outer case 30 in the portion of the glass plate 21 not held by the inner case 40 (the portion above the antenna disposition space X).

In this embodiment, inner ribs 41c are disposed on the inner case 40, that extend from the vicinity of the upper end of the side wall portion 41b toward the outer case 30 in parallel to the main face of the glass plate 21 at a height position substantially same as that of the upper wall portion 41d.

An end of the outer rib 31d of the outer case 30 overlaps on an end of the inner rib 41c of the inner case 40 in the direction of the thickness of the tablet terminal apparatus W. Concretely, the outer rib 31d of the outer case 30 and the inner rib 41c of the inner case 40 are formed at positions different from each other, such that the ends of the ribs 31d and 41c overlap on each other in the direction of the thickness of the tablet terminal apparatus W (in the direction perpendicular to the main face of the glass plate 21).

Figure 6:
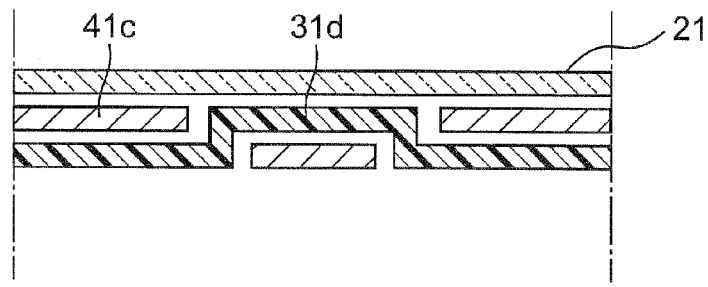
FIG. 6 is a cross-sectional view taken along a B-B line of FIG. 4 and FIG. 5.

Furthermore, in this embodiment, as depicted in FIGS. 5 and 6, the outer ribs 31d of the outer case 30 and the inner ribs 41c of the inner case 40 are formed at positions different from each other in the direction of the thickness of the tablet terminal apparatus W, such that the overlap portions in which the inner ribs 41c overlap at the glass plate (21) side position and overlap portions in which the outer ribs 31d overlap at the glass plate (21) side position are alternately made. In this configuration, each of the outer ribs 31d of the outer case 30 is inserted between the glass plate 21 and the inner rib 41c of the inner case 40 at each of the points at which the outer rib 31d of the outer case 30 is positioned closer to the glass plate 21 than the inner rib 41c of the inner case 40. Thereby, the outer ribs 31d of the outer case 30 is held by the inner ribs 41c of the inner case 40 and the protective structure by the portion of the outer ribs 31d of the outer case 30 for the glass plate 21 becomes firm. The inner case 40 is made from a metal and has high mechanical rigidity, and its rigidity is therefore high for holding the outer ribs 31d of the outer case 30. Thereby, the protective structure becomes firmer.

2. Conclusion

The tablet terminal apparatus W of this embodiment includes the display member 11, the glass plate 21 having the area larger than that of the front face of the display member 11 and covering the overall front face of the display member 11, the inner case 40 having the upper wall portion 41d holding the portion corresponding to the circumference of the display member 11 of the glass plate 21, and the outer case 30 surrounding the side portion of the glass plate 21. The outer case 30 has the outer ribs 31d (the second holding portions) that is inserted between the glass plate 21 and the inner case 40 and holds a portion of the glass plate 21 not held by the inner case 40.

With this configuration, the glass plate 21 is held by the inner ribs 41c of the inner case 40 and the outer ribs 31d of the outer case 30. Thus, when a force is externally applied to the glass plate 21, the force is received by the outer ribs 31*d* and the inner ribs 41*c*. Therefore, any breakage, and so on, of the glass plate 21 caused by the external force can be suppressed.

In this embodiment, the antenna disposition space X is formed between the inner case 40 and the outer case 30, the antenna 51 is disposed in the antenna disposition space X, and the portion of the glass plate 21 not held by the inner case 40 is the portion of the glass plate 21 on which the antenna disposition space X is projected in the direction perpendicular to the main face thereof.

With this configuration, even when a force is externally applied to the portion of the glass plate 21 on which the antenna disposition space X is projected in the direction perpendicular to the main face thereof, the force can be received by the outer ribs 31*d* and the inner ribs 41*c*. Therefore, any breakage, and so on, of the glass plate 21 caused by the external force can be suppressed.

In this embodiment, the upper wall portion 41*d* of the inner case 40 has the inner ribs 41*c* each extending in parallel to the main face of the glass plate 21, and the outer ribs 31*d* extend in parallel to the main face of the glass plate 21. The inner ribs 41*c* and the outer ribs 31*d* are formed such that the ends thereof overlap on each other in the direction perpendicular to the main face of the glass plate 21.

With this configuration, even when a force is externally applied to the glass plate 21, the force can more firmly be received due to the overlapping of the outer ribs 31*d* and the inner ribs 4*c* on each other.

In this embodiment, the inner ribs 41*c* and the outer ribs 31*d* are formed such that the overlap portions in which the inner ribs 41*c* overlap at the glass plate (21) side position and overlap portions in which the outer ribs 31*d* overlap at the glass plate (21) side position are alternately made.

With this configuration, the inner ribs 41*c* and the outer ribs 31*d* engage with each other to connect to each other. Therefore, when a force is externally applied to the glass plate 21, the outer ribs 31*d* and the inner ribs 41*c* can more firmly receive the force.

In this embodiment, the inner case 40 is made from a metal and the outer case 30 is made from a resin.

With this configuration, the inner case 40 made from the metal can further improve the rigidity of the tablet terminal apparatus W to which the mechanical rigidity is required because the tablet terminal apparatus W is used with portability, and the outer case 30 made from the resin can secure the convenience for the user to use the tablet terminal apparatus W.

Other Embodiments

As above, the first embodiment has been described as an example of the technique disclosed in this application. The technique in the present disclosure is however not limited to this and is applicable to an embodiment to which a change, replacement, addition, omission, etc., are arbitrarily made.

In this embodiment, the case is described where the electronic device is the tablet terminal apparatus. The electronic device is however not limited to this. The present disclosure is applicable widely to electronic devices such as a notebook computer, an electronic notebook, and an electronic gaming machine.

As above, the embodiments have been described as examples of the technique in the present disclosure. To do this, the accompanying drawings and the detailed description have been provided.

The components depicted in the accompanying drawings and described in the detailed description may therefore include not only the components essential for solving the problem but also the components not essential for solving the problem to exemplify the technique. It should not therefore be readily recognized that those non-essential components are essential based on the fact that those non-essential components are depicted in the accompanying drawings and described in the detailed description.

The embodiments are to exemplify the technique in the present disclosure and various changes, replacements, additions, omissions, etc., can therefore be made to the embodiments within the scope of claims or a scope equivalent thereto.

INDUSTRIAL APPLICABILITY

The present disclosure is applicable widely to portable electronic devices such as a notebook computer, a tablet computer, an electronic notebook, and an electronic gaming machine.

The invention claimed is:

1. An electronic device comprising:
   a display member;
   a glass plate that has an area larger than that of a front face of the display member, the glass plate covering the overall front face of the display member;
   a frame that has a first holding portion holding a portion of the glass plate corresponding to a circumference of the display member; and
   an outer covering member surrounding a side portion of the glass plate, wherein:
   the outer covering member has a second holding portion that is inserted between the glass plate and the frame and holds a portion of the glass plate not held by the frame;
   the first holding portion includes a plurality of first ribs that extend in parallel to a main face of the glass plate;
   the second holding portion includes a plurality of second ribs extending in parallel to the main face of the glass plate;
   the first ribs and the second ribs are formed such that ends thereof overlap each other in a direction perpendicular to the main face of the glass plate; and
   the first ribs and the second ribs are formed such that an overlap portion in which one of the first ribs overlaps at a glass plate side position and an overlap portion in which one of the second ribs overlaps at the glass plate side position are alternately disposed in a direction along an edge of the glass plate.

2. The electronic device of claim 1, wherein a predetermined space is formed between the frame and the outer covering member,
   wherein an antenna is disposed in the predetermined space, and
   wherein the portion of the glass plate not held by the frame is a portion of the glass plate on which the predetermined space is projected in a direction perpendicular to a main face thereof.

3. The electronic device of claim 1, wherein the frame is made of metal, and wherein the outer covering member is made of resin.

4. The electronic device of claim 1, wherein the electronic device is a tablet computer.

* * * * *